United States Patent
Venkatraj et al.

(10) Patent No.: US 7,865,880 B2
(45) Date of Patent: Jan. 4, 2011

(54) SYSTEM AND/OR METHOD FOR IMPLEMENTING EFFICIENT TECHNIQUES FOR TESTING COMMON INFORMATION MODEL PROVIDERS

(75) Inventors: Ashok Purushotham Ramasamy Venkatraj, Tucson, AZ (US); Gary William Steffens, Tucson, AZ (US); Abhishek Kar, Tucson, AZ (US)

(73) Assignee: LSI Corporation, Milpitas, CA (US)

( * ) Notice: Subject to any disclaimer, the term of this patent is extended or adjusted under 35 U.S.C. 154(b) by 912 days.

(21) Appl. No.: 10/989,698

(22) Filed: Nov. 16, 2004

(65) Prior Publication Data

US 2006/0106863 A1    May 18, 2006

(51) Int. Cl.
G06F 9/44 (2006.01)
G06F 9/45 (2006.01)
G06F 7/00 (2006.01)
G06F 17/30 (2006.01)

(52) U.S. Cl. .................. 717/126; 707/802; 707/803; 717/108; 717/124

(58) Field of Classification Search .......... None
See application file for complete search history.

(56) References Cited

U.S. PATENT DOCUMENTS

| 6,158,045 | A * | 12/2000 | You .............................. 717/124 |
| 6,182,245 | B1 * | 1/2001 | Akin et al. ...................... 714/38 |
| 7,054,853 | B2 * | 5/2006 | Johnson et al. ................. 707/2 |
| 7,188,121 | B2 * | 3/2007 | Tracey et al. ........... 707/103 R |
| 7,197,417 | B2 * | 3/2007 | Pramanick et al. .......... 702/119 |
| 7,209,851 | B2 * | 4/2007 | Singh et al. .................. 702/119 |
| 2002/0107872 | A1 * | 8/2002 | Hudis et al. .............. 707/104.1 |
| 2002/0144009 | A1 * | 10/2002 | Cheng et al. ................. 709/314 |
| 2003/0004956 | A1 * | 1/2003 | Johnson et al. ............. 707/100 |
| 2003/0055862 | A1 * | 3/2003 | Bhat .......................... 709/101 |
| 2004/0068733 | A1 * | 4/2004 | Longbardi ................... 719/316 |
| 2004/0073532 | A1 * | 4/2004 | Hiltgen et al. ................. 707/1 |
| 2004/0158838 | A1 * | 8/2004 | Tracey et al. ............... 719/316 |
| 2004/0181529 | A1 * | 9/2004 | Hiltgen et al. ................. 707/9 |
| 2005/0171953 | A1 * | 8/2005 | Bonilla et al. ................. 707/10 |
| 2005/0172306 | A1 * | 8/2005 | Agarwal et al. ............. 719/328 |
| 2005/0283763 | A1 * | 12/2005 | Fujikawa et al. ............ 717/124 |

OTHER PUBLICATIONS

DMTF Specification for CIM Operation Over HTTP, Status: Preliminary, DSP0200, Version 1.1, May 2, 2002.*
"class." The Free On-line Dictionary of Computing. Denis Howe. Jan. 13, 2009. <Dictionary.com http://dictionary.reference.com/browse/class>.*

(Continued)

Primary Examiner—Tim T. Vo
Assistant Examiner—Garrett Smith
(74) Attorney, Agent, or Firm—Christopher P. Maiorana, PC

(57) ABSTRACT

A method for testing a provider in a common information model. The method generally includes the steps of (A) generating a test case class of the common information model, the test case class residing in a class hierarchy of an object-oriented model, (B) generating a client test case class of the common information model below the test case class in the class hierarchy, the client test case class defining control of at least one logical configuration for the provider and (C) generating an instance tester class of the common information model below the client test case class in the class hierarchy, the instance tester class defining at least one verification module for testing the provider.

21 Claims, 4 Drawing Sheets

OTHER PUBLICATIONS

"software." The American Heritage® Science Dictionary. Houghton Mifflin Company. Jan. 13, 2009. <Dictionary.com http://dictionary.reference.com/browse/software>.*

"Common Information Model (CIM) Specification", Version 2.2, Jun. 14, 1999, Distributed Management Task Force, Inc., pp. 1-105, Portland, Oregon.

* cited by examiner

SYSTEM AND/OR METHOD FOR IMPLEMENTING EFFICIENT TECHNIQUES FOR TESTING COMMON INFORMATION MODEL PROVIDERS

FIELD OF THE INVENTION

The present invention relates to device management software generally and, more particularly, to a system and/or method for implementing efficient techniques for testing common information model providers.

BACKGROUND OF THE INVENTION

A Common Information Model (CIM) is a standardized system to model devices and applications easily. CIM describes devices (i.e., a storage array) in a common and consistent way irrespective of the vendor and device architecture. A CIM provider is a software component that provides information about an entity (logical or physical) to a CIM Object Manager (CIMOM). For example, a storage provider is an executable that provides a conduit for management activities of storage devices.

Referring to FIG. 1, a diagram of a conventional CIM system 10 implementation is shown. The CIM system 10 generally comprises a CIM client 12 and a CIM server 14. The CIM client 12 generally comprises a management application 16 in communication with the CIM server 14 through an interface 17. The CIM server 14 generally comprises a CIM object manager 18 and one or more CIM providers 20. The CIM client 12 can request data from a managed resource such as a storage array. In such a case, the CIM object manager 18 forwards the request to a CIM provider 20 for the managed resource, if one exists. A number of managed devices 22 are shown controlled by the CIM providers 20. The CIM object manager 18 is the central component of the CIM server 14. The CIM object manager 18 is responsible for the communication between various components in the CIM server 14.

A problem associated with the conventional CIM approach is that many CIM providers 20 can simultaneously manage a single system/device 22. All of the CIM providers 20 fulfill specific CIM operations. For example, a partial list of CIM providers 20 that would be needed to manage a single storage system 22 include (i) a disk drive CIM provider, (ii) a disk extent CIM provider, (iii) a free extent CIM provider, (iv) a namespace CIM provider, (v) a registered profile and sub-profile CIM provider, (vi) a storage pool and volume CIM provider and (vii) a logical unit number mapping and masking CIM provider. The common operations that a CIM provider 20 will be asked to service by the CIM client 12 are retrieving, enumerating, creating, updating or deleting objects, performing queries, making method calls, getting properties and setting the properties of an object. Each CIM provider 20 performs CIM operations though the particular operations fulfilled can vary depending upon the device or application that is being managed.

A system is needed to test the CIM providers 20. Writing specialized unit tests for CIM providers 20 that share common functionality is tedious and time consuming. Standardizing testing procedures for CIM providers 20 would be desirable. Standardizing would reduce the time and cost complexities used to test CIM provider code, since CIM providers 20 exist for managing a broad range of physical servers, storage devices, fibre channel switches and appliances, tape, host bus adapters, IP networking devices and logical applications, operating systems, users, policies, database-entities. Reducing the time and resources needed for testing the CIM providers would also be desirable.

SUMMARY OF THE INVENTION

The present invention concerns a method for testing a provider in a common information model. The method generally comprises the steps of (A) generating a test case class of the common information model, the test case class residing in a class hierarchy of an object-oriented model, (B) generating a client test case class of the common information model below the test case class in the class hierarchy, the client test case class defining control of at least one logical configuration for the provider and (C) generating an instance tester class of the common information model below the client test case class in the class hierarchy, the instance tester class defining at least one verification module for testing the provider.

The objects, features and advantages of the present invention include providing a system and/or method for testing CIM providers that may (i) standardize testing procedures, (ii) reduce testing time, (iii) reduce testing costs and/or (iv) reduce test complexity.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
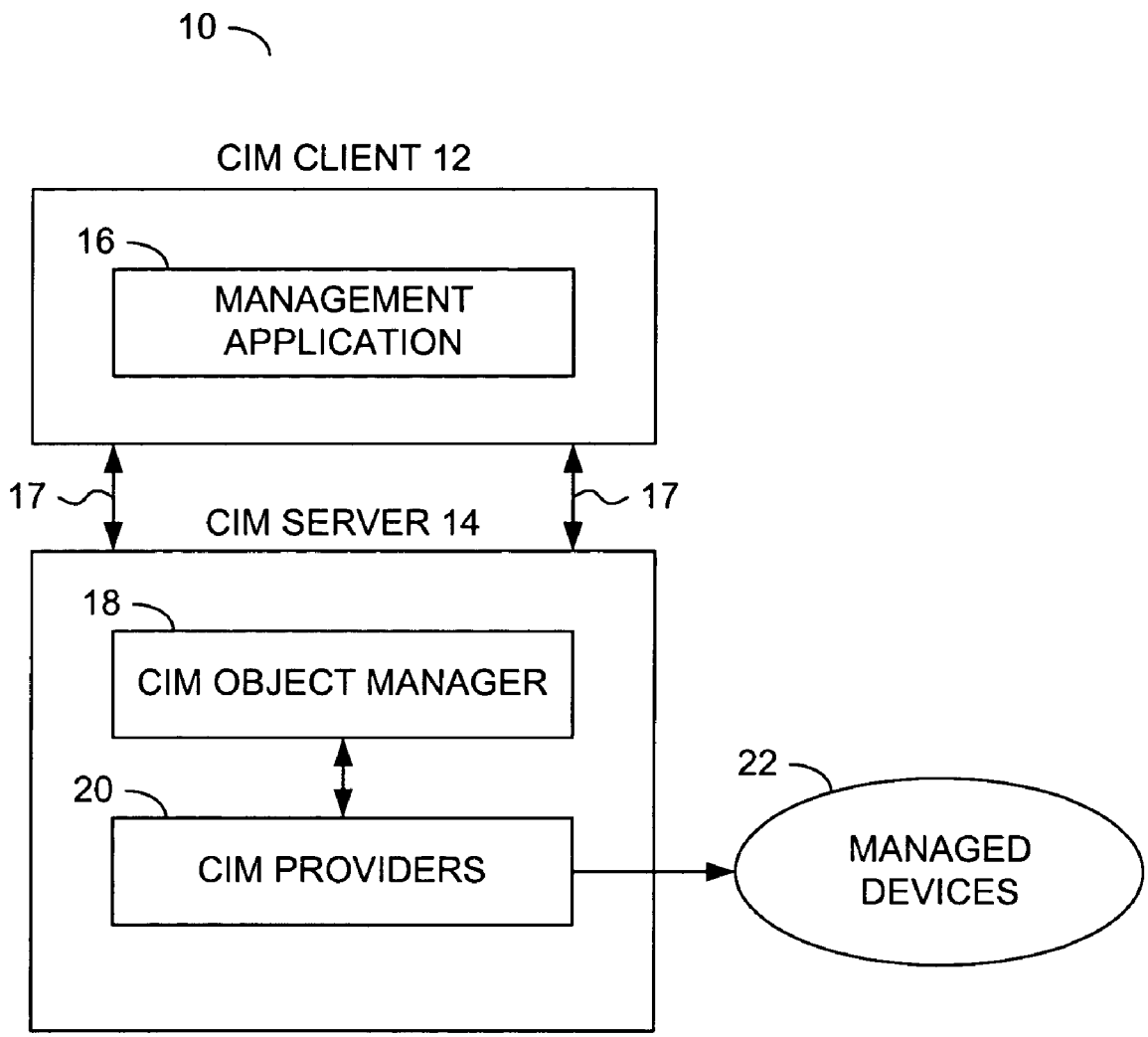
FIG. 1 is a diagram of a conventional common information model system implementation.

A Common Information Model (CIM) is a standardized system to easily model devices and applications. A CIM schema and a CIM standard are produced by the Distributed Management Task Force, Inc. of Portland, Oreg. (see www.d-mtf.org.) The CIM standard specification, document number DSP0004, version 2.2, dated Jul. 14, 1999 is hereby incorporated by reference in its entirety. The CIM generally defines an implementation—neutral schema describing overall management information in a network/enterprise environment.

A CIM client 12 generally interacts with a CIM server 14 by issuing CIM requests. The CIM client 12 may wait to receive CIM responses from the CIM server 14 and processes the responses. The CIM server 14 generally receives and processes the CIM requests from the CIM client 12 and issues the CIM responses. Each CIM request and/or response message may be encoded using CIM-Extensible Markup Language (CIM-XML) communication protocol packaged in a Hypertext Transfer Protocol (HTTP) message.

The Extensible Markup Language is a powerful tool that has the capability of modeling data. For example, an XML document may be a collection of data represented in XML. An XML schema is a grammar that generally describes the structure of an XML document. The CIM-XML encoding generally defines XML elements, which may be used to represent CIM classes and instances.

The Hypertext Transfer Protocol (HTTP) is an application-level protocol generally used for distributed, collaborative, hypermedia information systems. HTTP is a generic stateless protocol that may be used for many tasks through extension of request methods, error codes and headers. Basically, CIM request messages and response messages may be represented within XML and the request messages and response messages may be encapsulated within HTTP packets as a payload.

A CIM object manager 18 may be a service layer that interfaces one or more CIM providers 20 to one or more CIM clients 12. The CIM providers 20 generally instrument one or more aspects of a CIM schema. A CIM schema may be a meaningful grouping of collection of CIM objects.

A CIM class may be a computer representation or a template of a managed object type. A CIM class generally defines every hardware and software resource that may be manageable through the common information model (e.g., a CIM class may define a logical or a physical configuration). Each CIM class is generally a blueprint (or template) for a discrete CIM-managed resource. All instances of the resource may use the blueprint defined in the associated CIM class. For example, all services that are instances of a disk drive class may have the same properties.

Each CIM class generally has one or more properties and/or one or more methods. Properties may describe attributes of a CIM class. Methods may describe actions that may be performed on hardware and/or software resource. Methods may be classified into extrinsic and intrinsic methods. Intrinsic methods are generally used to obtain, modify, enumerate or delete CIM classes and/or instances. Intrinsic methods may be further characterized by the fact of being made against a CIM namespace. Extrinsic methods are generally defined as a method on a CIM class in a schema supported by the CIM server 14. Any CIM server 14 may be assumed to support extrinsic methods. Extrinsic methods may be invoked on CIM class instances. Extrinsic methods generally use the CIM providers 20 to communicate with associated managed devices 22.

Each CIM provider 20 may be a software component that functions as an interface layer between a managed device 22 and the CIM object manager 18. A CIM provider 20 generally interfaces with the managed device 22 through available management interfaces and may translate between data in a CIM standard format and a data format of the managed device 22. Communication between CIM providers 20, the CIM object manager 18 and the managed devices 22 may be bidirectional. The CIM provider 20 may populate a CIM object with requested data from a managed device 22 or transfer CIM object data to a managed device 22. An interface between a CIM provider 20 and a managed device 22 may be unique to the managed device 22. A CIM provider 20 may be embedded in a managed device 22 or may reside on an external piece of hardware.

Testing is generally done on a per CIM class basis. A basic goal of testing a CIM provider 20 may be to verify instances created and returned by the CIM provider 20. Essentially, a tester module may pose as a CIM client 12 at the interface 17 to the CIM server 14 and verify if a CIM provider 20 under test behaves as expected.

The present invention generally involves generation of an object-oriented class hierarchy of test classes. Common testing functionality may reside in one or more test super classes, which act as test drivers. One or more subclasses may act as a tester for a CIM class. Subclasses may serve as an answer book such that whenever a test driver wants to know a correct answer for anything related to the CIM class under test (e.g., expected properties and/or values), the test driver may send a message to the subclass to retrieve the answers. As such, common testing functionality may be moved to a super class avoiding repetition of code. CIM class specific testing may be implemented in the subclasses. The subclasses may be configured to provide an answer for common functionalities by making the subclasses' behavior or methods abstract in the super classes. Each test subclass generally tests a single CIM class managed by the CIM provider 20.

The instances of subclasses generally possess the correct and/or the expected properties. If a CIM client 12 were to invoke an intrinsic method, the testing may verify if the obtained output arguments match the expected output arguments. Extrinsic method invocations generally involve changes in configuration of the managed system/devices 22. If the CIM client 12 were to invoke an extrinsic method, the testing may verify if a new state, reached after the extrinsic method call, is an expected state.

The present invention generally provides a design of a test suite for CIM providers 20. The test suite may involve testing under a controlled environment where all changes may be introduced by the test. Two forms of instances generally exist: (i) instances representing something specific on the hardware (e.g., disk drive, etc.) and (ii) instances representing CIM concepts that may not have a direct physical counterpart in the managed device (e.g., a registered profile). Within the two instances there may be a concept of relationships, which may also be represented by instances (e.g., a relationship between a disk drive and a volume group).

Test suites may test states and transitions of the CIM object manager 18. The test suites may test common logical configurations. The test suites may test for failures reported for the system if the results are exposed by the common information model. The test suites may test creation, deletion and/or modification of CIM instances. The test suite may test CIM instances for correctness in possessed properties. If any error checking is not explicitly done by the CIM object manager 18, but rather implemented in a CIM provider 20, then the test suite may validate the error checks.

Some groups of CIM test classes use a common logical configuration, while other CIM test classes may not use a logical configuration. Both logical configuration categories may use the CIM object manager 18 for servicing requests and/or queries. Furthermore, some of the CIM classes may not utilize CIM providers 20 for testing. Requests from such CIM classes may be satisfied by the CIM object manager 18 itself without contacting a CIM provider 20. The test suite may be designed to handle all the categories listed above with minimal redundancy in code and central processor unit resources. The present invention may also deal with simplifying (i) a verification of CIM instances, (ii) whether the CIM instances were properly created, deleted or modified and (iii) determining if the properties of CIM instances may be correct.

Figure 2:
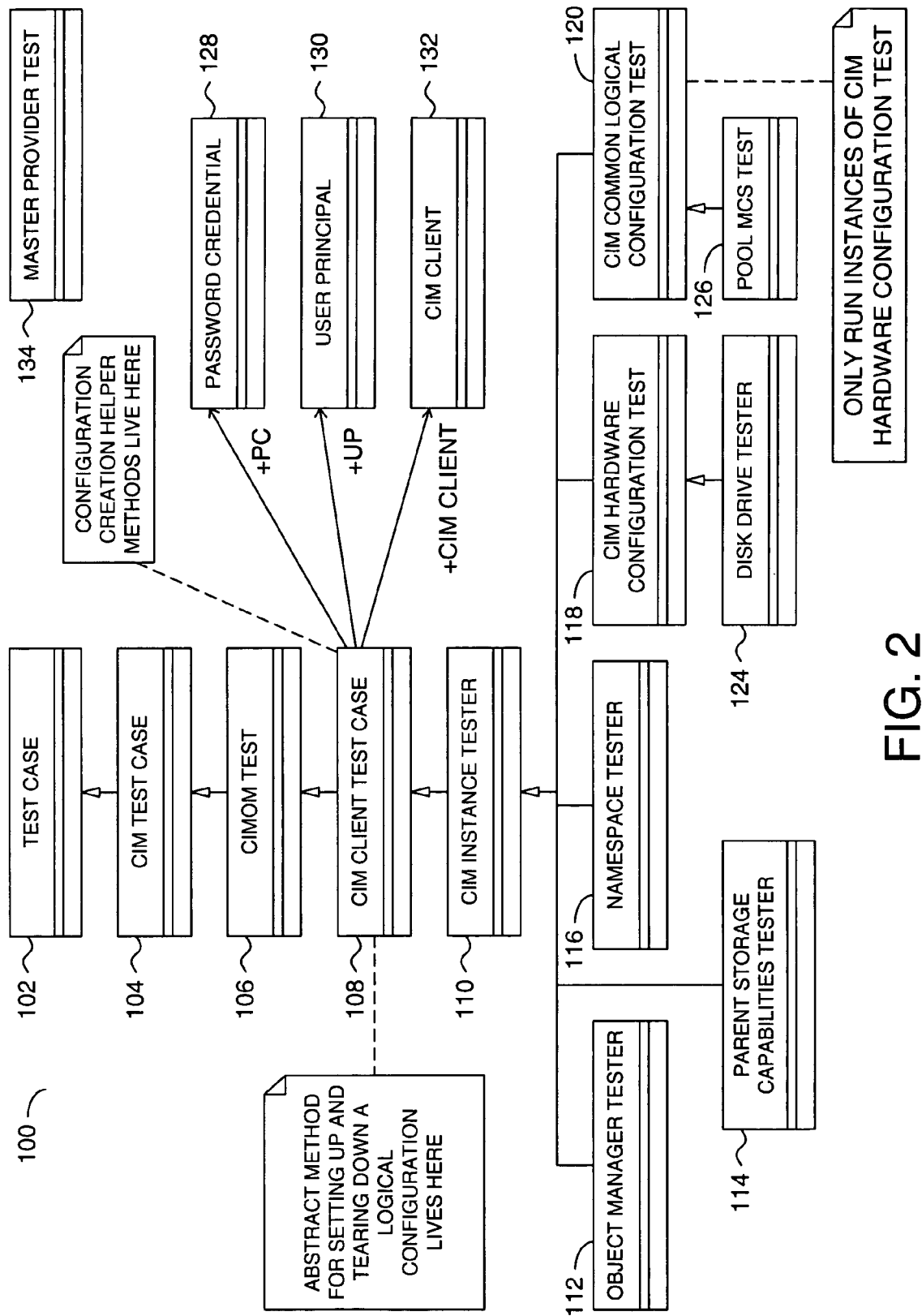
FIG. 2 is a Unified Modeling Language class diagram of an example framework illustrating a preferred embodiment of the present invention.

Referring to FIG. 2, a Unified Modeling Language (UML) class diagram of an example framework 100 illustrating a preferred embodiment of the present invention is shown. The framework 100 may be generated using Java. Other object oriented programming languages may be utilized to meet the criteria of a particular application. The example framework 100 generally illustrates a test suite for testing CIM providers 20. The framework 100 may implement an object-oriented approach using familiar tools so that developers may write tests that may be easily maintained over time. The test environment created by the framework 100 generally allow models of specifications to be expanded without having to rewrite large sections of code. The framework 100 generally provides all basic information common to all CIM providers 20. To test a specific CIM provider 20, only a small amount of code is generally created to define (i) behavior of the specific CIM provider 20 and (ii) expected results from the specific CIM provider 20.

The framework 100 generally comprises a class (or object) 102, a class (or object) 104, a class (or object) 106, a class (or object) 108, a class (or object) 110, a class (or object) 112, a class (or object) 114, a class (or object) 116, a class (or object) 118, a class (or object) 120, a class (or object) 124, a class (or object) 126, a class (or object) 128, a class (or object) 130, a class (or object) 132 and a class (or object) 134. The arrows connecting class to other class generally represent inheritance from the upper (super) class to the lower (sub) class.

The class 102 may be referred to as a test case class. The test case class 102 may be implemented using JUnit. JUnit is a simple framework to write repeatable tests. JUnit is generally an instance of an XUnit architecture for unit testing frameworks. JUnit is open source software available from the JUnit organization at www.JUnit.org.

The class 104 may be referred to as a CIM test case class. The CIM test case class 104 generally defines a base test class for all CIM related development tests and is a subclass of test case class 102. CIM test case class 104 generally provides common methods and variable access so that subsequent tests are not rewriting the same code.

All test cases that test a CIM provider 20 should have the CIM object manager 18 running. The class 106 may be referred to as a CIM object manager (CIMOM) test class. The CIM object manager test class 106 may be a super class that checks to see if a CIM object manager 18 is running. If no CIM object manager 18 is running, the CIM object manager test class 106 may start a CIM object manager 18.

The class 108 may be referred to as a CIM client test case class. The CIM client test case class 108 generally enables subclasses to get tested from a CIM client perspective. The CIM client test case class 108 generally contains one or more logical configuration creation helper modules and one or more logical configuration deletion helper modules.

The class 110 may be referred to as a CIM instance tester class. The CIM instance tester class 110 may be a super class of all the CIM class testers. The CIM instance tester class 110 is generally the heart of the test suite. All verification modules may be implemented in the class 110. Test cases that may be run without discovering a managed device may be subclasses of the CIM instance tester class 110 (e.g., an object manager tester class, a namespace tester class, etc.). Test cases, that utilize only a physical configuration, may be subclasses of the class 118. Test cases, that utilize a logical configuration, may be subclasses of the class 120.

The class 112 may be referred to as the object manager tester class. The object manager tester class 112 may be operational to validate instances of an object manager. An instance of an object manager may be enumerated for each CIM object manager.

The class 114 may be referred to as a parent storage capabilities tester class. The parent storage capabilities tester class 114 may be operational to validate instances of parent storage capabilities. An instance of parent storage capabilities may be created, for example, for the unassigned storage in a storage array.

The class 116 may be referred to as the namespace tester class. The namespace tester class 116 may be operational to validate instances of a namespace. An instance of the namespace may be enumerated for each namespace of a CIM provider. The namespace tester class 116 generally represents the CIM provider's namespace.

The class 118 may be referred to as a CIM hardware configuration test class. The CIM hardware configuration test class 118 may represent all test classes that do not use a logical configuration for testing.

The class 120 may be referred to as a CIM common logical configuration test class. The common logical configuration test class 120 may represent all test classes that use a common logical configuration for testing.

The class 124 may be referred to as a disk drive tester class. The disk driver tester class 124 may be operational to validate instances of a disk drive. An instance of the disk drive may exist for every drive in a drive tray.

The class 126 may be referred to as a pool management computing system (MCS) test class. The pool MCS test class 126 is generally a driver for testing all classes that utilize storage pools and storage volumes for testing. The pool MCS test class 126 may invoke extrinsic methods to create a logical configuration (e.g., creating storage pools and storage volumes). Next, testing of classes that depend upon the existence of the created logical configuration may start. Finally, extrinsic method to tear down the logical configuration (e.g., delete the created storage pools and storage volumes) may be invoked.

The class 128 may be referred to as a password credential class. The class 130 may be referred to as a user principal class. The class 132 may be referred to as a CIM client class. The password credential class 128 and the user principal class 130 may be generally provide authentication credentials (e.g., user name and password) of the CIM client to the CIM object manager.

The class 134 may be referred to as a master provider test class. The master provider test class 134 may be operational to run all of the tests that pertain to the CIM providers 20.

A super class may be a smart class and generally contains the core functionality of testing CIM providers 20. Each subclass generally tests a specific CIM provider 20. The subclasses may contain one or more expected values for the CIM provider 20 being testing. An advantage of the super class/subclass method is code reduction, thus reducing the size of a test executable. For example, if N subclasses exist and all of the subclasses have code C=X+Y, where X is the common code size, and Y is the CIM class specific testing code size, then a savings of X*N as code size reduction may be realized.

All test classes using a logical configuration to be setup on a managed system may follow a protocol (i) setup a logical configuration, (ii) conduct testing and (iii) tear down the configuration when done. The present invention generally follows the idea of every test class possessing apriori knowledge about the configuration that may be assumed to be invariant at the start of testing a CIM class. The advantage thus realized may be that every test case may assume to start testing with a known configuration.

The entire test suite for CIM provider testing is generally encapsulated in the single master provider tester class 134. The master provider tester class 134 may add all test cases to the test suite and run all of the test cases. The master provider tester class 134 may categorize test cases into two major groups (i) those that utilize only a physical configuration and (ii) those that utilize a logical configuration. The test cases that utilize only a physical configuration may be tested independently in any order. The remaining test cases may be grouped such that test cases that utilize a common logical configuration may be in the same testing pool. As test cases are found which have a common logical configuration, the CIM logical configuration tester class 120 may take responsibility for setting up a common logical configuration and thus reduce code redundancy. The CIM logical configuration tester class 120 may also run the test cases that have the same logical configuration and tear down the configuration when done.

A goal of the present invention may be to avoid redundant testing. A problem to avoiding redundant testing is generally encountered while testing CIM instances that may depend upon the existence of a logical configuration. Testing of extrinsic methods that setup and tear down logical configurations may also be performed. Two sets of test cases thus exist (i) one set that may test CIM instances dependent upon the existence of a logical configuration and (ii) another set that may test extrinsic methods that setup and tear down logical configurations. A solution of the present invention may be to combine the two sets into a single test case by (i) first invoking extrinsic methods to setup a logical configuration, (ii) test the instances that depend upon the existence of a logical configuration and (iii) invoke extrinsic methods which tear down the logical configuration.

Some extrinsic methods may not participate in either the setup/tear down of a logical configuration. The test cases for such extrinsic methods may be passed as described before with a method name, a valid input and one or more expected output parameters. A result of executing an extrinsic method may be instances being created, deleted, and/or instances being modified. A bundle of instances that may be created, deleted and/or modified are generally encapsulated into an extrinsic method call effects object and passed to the super class. The super class generally knows how to unwrap the information, invoke the extrinsic method and check if the obtained output parameters match the expected output parameters. After the invocation of the extrinsic method, the actual effects may be compared with the expected answers from the extrinsic method call effects to verify an absence of fatal errors.

Figure 3:
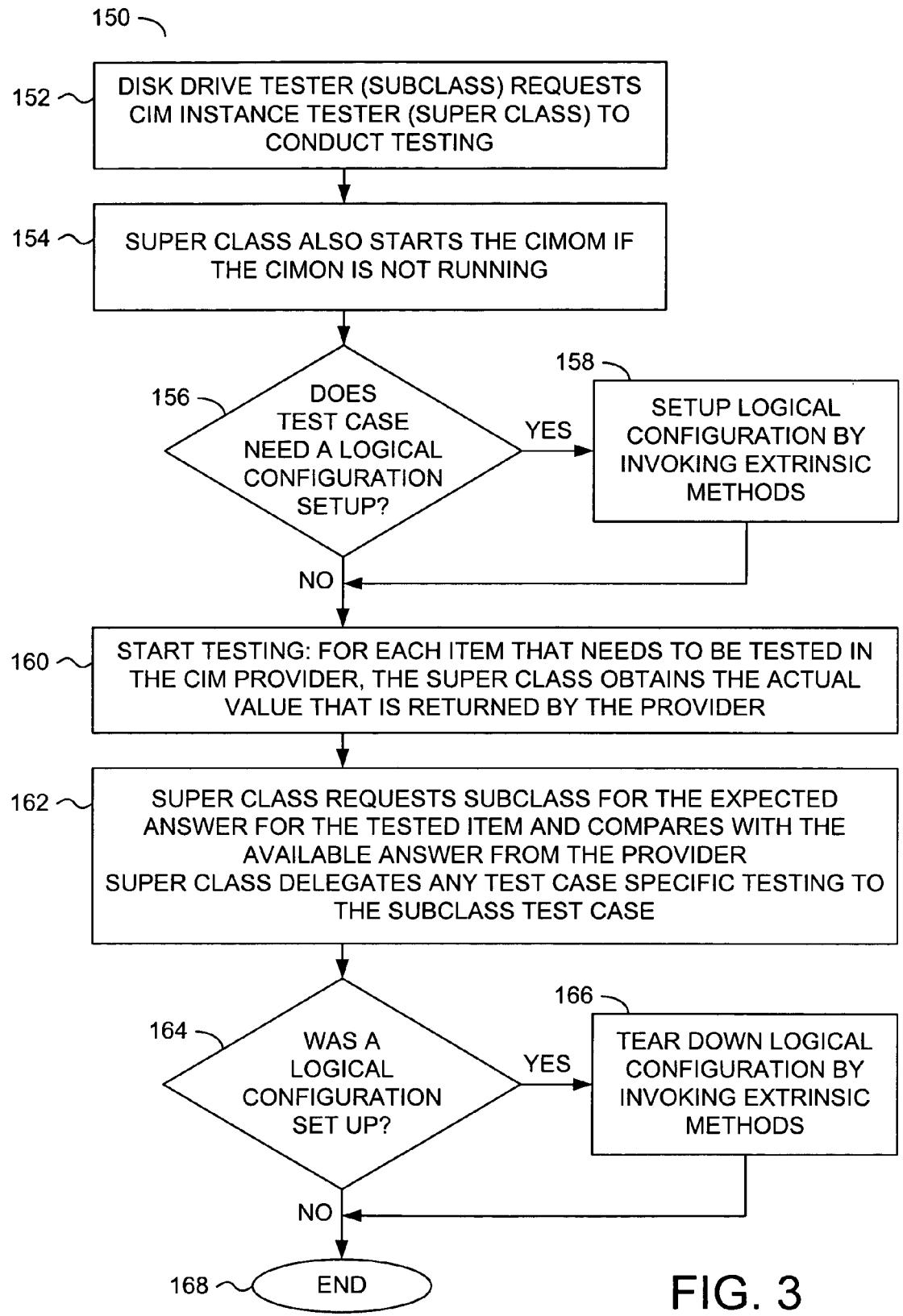
FIG. 3 is a flow diagram illustrating an example method for a life cycle of a test case.

Referring to FIG. 3, a flow diagram illustrating an example method 150 for a life cycle of a test case is shown. The method 150 generally comprises a step (or state) 152, a step (or state) 154, a step (or state) 156, a step (or state) 158, a step (or state) 160, a step (or state) 162, a step (or state) 164, a step (or state) 166 and a step (or state) 168.

The step 152 generally starts when a subclass requests a super class to conduct testing. The step 154 may have the super class start the CIM object manager 18, if not already running. The decision step 156 may determine if a test case utilizes a logical configuration setup or not. If so (e.g., the YES branch of decision step 156), the method 150 may move to the step 158 where a logical configuration setup is implemented by invoking extrinsic methods. Otherwise (e.g., the NO branch of decision step 156), the method 150 may move to the step 160. The step 160 may perform the actual testing. Before, during or following the testing, the step 162 may request a subclass provide one or more expected answers for the tested item. Next, the decision step 164 may determine if a logical configuration was set up. If so (e.g., the YES branch of decision step 164), the method 150 generally moves to the step 166 to tear down a logical configuration by invoking extrinsic methods and then end 168. If no logical configurations were setup (e.g., the NO branch of decision step 164), the method 150 may end 168.

Figure 4:
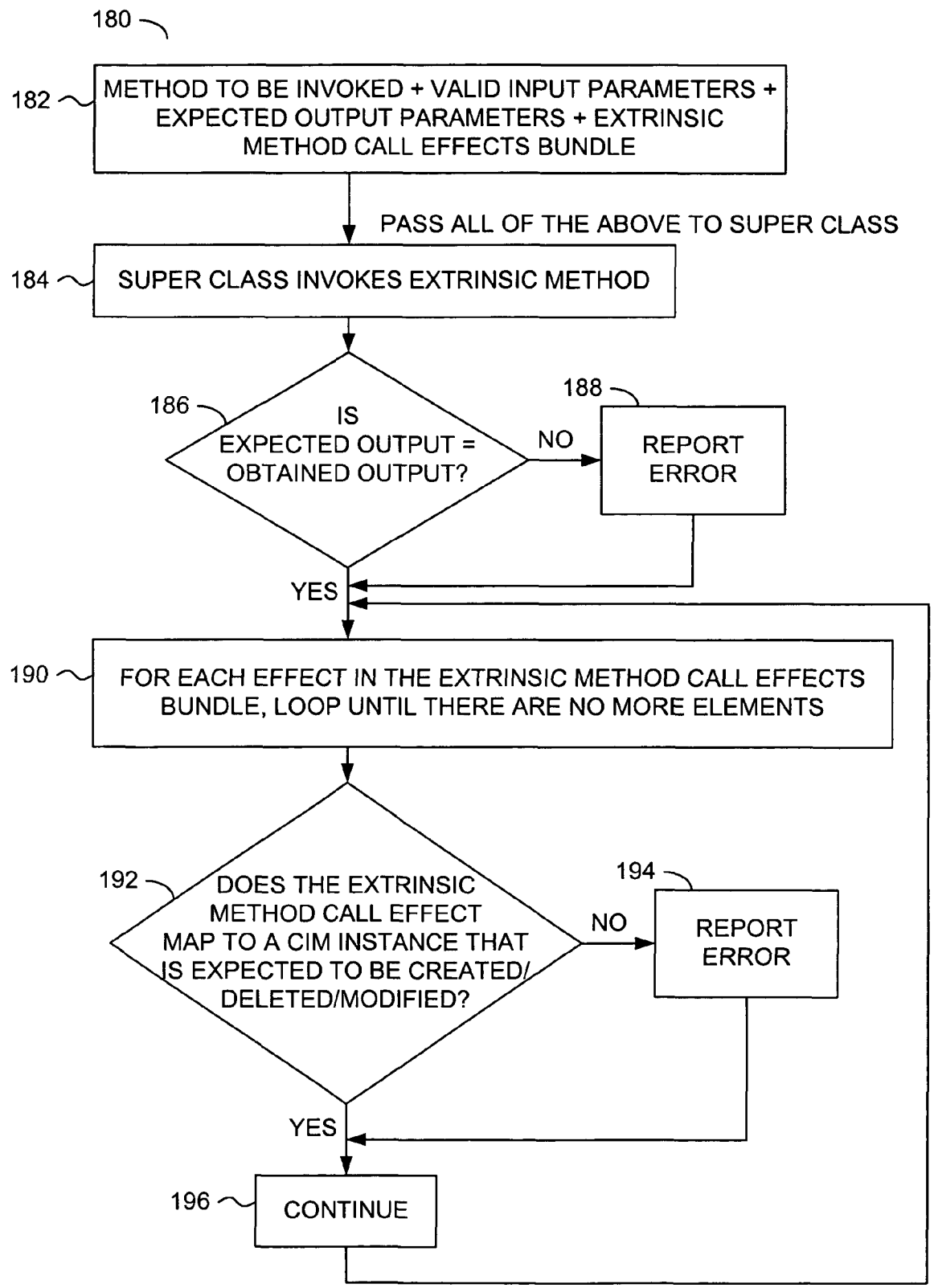
FIG. 4 is a method for testing extrinsic methods that do not setup/tear down a logical configuration.

Referring to FIG. 4, a method 180 is shown for testing extrinsic methods that do not setup/tear down a logical configuration. The method 180 generally comprises a step (or state) 182, a step (or state) 184, a step (or state) 186, a step (or state) 188, a step (or state) 190, a step (or state) 192, a step (or state) 194 and a step (or state) 196.

The step 182 generally encapsulates a combination of (i) a method to be invoked, (ii) a valid input parameter, (iii) an expected output parameter and (iv) the extrinsic method call effects bundle for passing to a super class. The step 184 generally represents the super class invoking the extrinsic method. The decision step 186 may determine if an expected output matches an obtained output from the extrinsic method. If so (e.g., the YES branch of decision step 186), the method 180 may move to the state 190. If not (e.g., the NO branch of decision step 186), the method 180 may continue with the step 188 for generating an error report. From step 188 and the NO branch of decision step 186, the step 190 may cycle through a loop for each element in the extrinsic method call effect bundle. The decision step 192 may determine, one at a time, if each extrinsic method maps to a CIM instance expected to be created, deleted and/or modified. If so (e.g., the YES branch of decision step 192), the method 180 may continue the loop with the step 196. If not (e.g., the NO branch of the decision step 192), the step 194 may issue an error report and then continue with the loop at the step 196. The step 196 generally continues with the next extrinsic method call effects at step 190, if one exists, else the step 196 terminates the method 180.

The function performed by the diagrams of FIGS. 2-4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICS, FPGAS, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for testing a provider in a common information model, comprising the steps of:

(A) generating a test suite in a computer using an object oriented programming language, said test suite being executable by said computer and defining a class hierarchy, said class hierarchy including (i) a test case class of said common information model, said test case class providing one or more program codes and access to one or more variables, each of said program codes and said variables being common to a plurality of tests of said provider, (ii) a client test case class of said common information model, wherein said client test case class is a subclass of said test case class in said class hierarchy, said client test case class defining one or more creation helper modules, wherein said creation helper modules are configured to set up at least one logical configuration of said provider and (iii) an instance tester class of said common information model, wherein said instance tester class is a subclass of said client test case class in said class hierarchy, said instance tester class defining at least one verification module, wherein each of said verification modules is configured to test a corresponding class managed by said provider;

(B) executing said creation helper modules to set up said logical configurations on said provider;

(C) executing said verification modules to invoke one or more methods in said provider to cause said provider to generate a plurality of values;

(D) transferring a plurality of said values from said provider to said instance tester class in response to said test; and (E) comparing in said instance tester class said values against a plurality of answers stored in said test suite.

2. The method according to claim 1, wherein said common information model defines an implementation-neutral schema describing overall management information in at least one of (i) a network environment and (ii) an enterprise environment.

3. The method according to claim 1, wherein (i) said logical configurations comprise a storage volume of said provider and (ii) said client test case class contains at least one deletion module that tears down said logical configuration on said provider.

4. The method according to claim 1, wherein said test case class comprises common testing functionality usable by at least one subclass test case, wherein said test case class is a highest level in said class hierarchy.

5. The method according to claim 1, wherein said class hierarchy includes an object manager test class of said common information model, said object manager test class is a subclass of said test case class and a super class of said client test case class in said class hierarchy, and said object manager class starting an object manager associated with said provider if said object manger is not running.

6. The method according to claim 5, further comprising the step of:
communicating between said test suite and said provider through said object manager.

7. The method according to claim 1, wherein a manager tester class of said common information model is a subclass of said instance tester class in said class hierarchy.

8. The method according to claim 7, further comprising the steps of:
testing said object manager to cause said object manager to generate a plurality of results;
providing said answers corresponding to said objected manager from said manager tester class to said instance tester class; and
comparing in said instance tester class said answers of said object manager with said results generated by said object manager.

9. The method according to claim 7, wherein a logical configuration test class of said common information model is a subclass of said instance tester class in said class hierarchy.

10. The method according to claim 9, further comprising the step of:
providing said answers corresponding to said provider from said logical configuration test class to said instance tester class said to test said provider having a logical configuration setup.

11. The method according to claim 9, wherein a hardware configuration test class of said common information model is a subclass of said instance tester class in said class hierarchy.

12. The method according to claim 11, further comprising the step of:
providing said answers corresponding to said provider from said hardware configuration test class to said instance tester class said to test said provider without a logical configuration setup.

13. A method for testing a provider in a common information model, comprising the steps of:

(A) generating a request from a tester class of said common information model to an instance tester class of said common information model within a computer, said request to conduct a test of said provider in a test suite environment, said tester class and said instance tester class both residing in a class hierarchy of an object-oriented model executable by said computer, wherein said instance tester class is a super class of said tester class in said class hierarchy and said instance tester class defines at least one verification module;

(B) executing said verification modules to invoke one or more methods in said provider to cause said provider to generate a plurality of values;

(C) transferring said values from said provider to said instance tester class in response to said test;

(D) providing a plurality of answers from said tester class to said instance tester class; and (E) comparing in said instance tester class said values with said answers to determine if said provider passes said test.

14. The method according to claim 13, wherein said common information model defines an implementation-neutral schema describing overall management information in at least one of (i) a network environment and (ii) an enterprise environment.

15. The method according to claim 13, further comprising the steps of:
performing a logical configuration setup on said provider prior to testing said provider by invoking at least one first extrinsic method in a client test case class of said class hierarchy; and
performing a logical configuration tear down after testing said provider by invoking at least one second extrinsic method in said client test case class, wherein said client test case class is a super class of said instance tester class in said class hierarchy.

16. The method according to claim 13, further comprising the step of:
starting an object manager of said common information model prior to said testing, said object manager logically residing between said provider and said instance tester class.

17. A method for testing an extrinsic method for a provider in a common information model, comprising the steps of:

(A) bundling all of (i) a name of said extrinsic method, (ii) a plurality of test inputs and (iii) a plurality of answers into an encapsulating object using a computer, wherein said extrinsic method does not involve either (a) a set up of a logical configuration on said provider or (b) a tear down of said logical configuration;

(B) passing said encapsulating object from a first class of said common information model to a second class of said common information model, said second class being configured to test said extrinsic method based on said test inputs, said first class and said second class both residing in a class hierarchy of an object-oriented model executed by said computer and said second class being a super class of said first class in said class hierarchy;

(C) invoking said extrinsic method from said second class to test said extrinsic method and thereby obtain a plurality of test results from said extrinsic method; and (D) comparing in said second class said test results to said answers to determine if said extrinsic method passes said test.

18. The method according to claim 17, wherein said common information model defines an implementation-neutral schema describing overall management information in at least one of (i) a network environment and (ii) an enterprise environment.

19. The method according to claim 17, further comprising the step of:

reporting an error in response to at least one of said test results not matching a respective at least one of said answers.

20. The method according to claim 19, further comprising the step of:

reporting an error in response to at least one of a plurality of effects in said encapsulating object not mapping to an instance class of said common information model.

21. The method according to claim 17, wherein a client test case class of said class hierarchy contains at least one creation module that sets up said logical configuration on said provider, said logical configuration comprising a storage pool.

* * * * *